United States Patent
Foy et al.

(10) Patent No.: US 9,972,117 B2
(45) Date of Patent: *May 15, 2018

(54) FLYING EFFECTS CHOREOGRAPHY SYSTEM

(71) Applicant: Foy Inventerprises, Inc., Las Vegas, NV (US)

(72) Inventors: Teresa Foy, Henderson, NV (US); Joe McGeough, Henderson, NV (US); Matthew Bevacqua, Henderson, NV (US); Carroll R. Mayhew, Carrollton, TX (US)

(73) Assignee: Foy Inventerprises, Inc., Las Vegas, NV (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/679,637

(22) Filed: Apr. 6, 2015

(65) Prior Publication Data
US 2015/0356766 A1    Dec. 10, 2015

Related U.S. Application Data

(63) Continuation of application No. 13/415,370, filed on Mar. 8, 2012, now Pat. No. 9,001,130.
(Continued)

(51) Int. Cl.
G06T 13/80    (2011.01)
G06T 13/20    (2011.01)

(52) U.S. Cl.
CPC ........... *G06T 13/80* (2013.01); *G06T 13/20* (2013.01)

(58) Field of Classification Search
None
See application file for complete search history.

(56) References Cited

U.S. PATENT DOCUMENTS 7,583,292 B2    9/2009    Kondo et al.
8,147,344 B2*   4/2012    Crawford ............... A63G 21/20
                                                 104/112
(Continued)

OTHER PUBLICATIONS

Schoellig et al ("A platform for Dance Performances with Multiple Quadrocopters", 2010, IEEE/RSJ International Conference on Intelligent Robots and Systems (IROS)—Workshop on Robots and Musical Expressions.).*

(Continued)

*Primary Examiner* — Xin Sheng
(74) *Attorney, Agent, or Firm* — Weide & Miller, Ltd.

(57) ABSTRACT

A flying effects choreography system provides visualizations of flying effects within a virtual environment. The system allows choreographers to define a sequence of waypoints that identify a path of motion. A physics engine of the system may then calculate position data for a performer or other element attached to a free-swinging pendulum cable, as the performer and pendulum cable move along the path of motion. In this manner, the position data describes the motion of the performer, including the pendulum effect or swing of the performer on the pendulum cable. The position data may be used to generate one or more visualizations that show the performer's motion, including the pendulum effect. The choreographer may review the visualizations and make modifications any number of times, until a desired flying effect is produced, without having to physically implement the flying effect in the real world.

11 Claims, 5 Drawing Sheets

Related U.S. Application Data

(60) Provisional application No. 61/450,768, filed on Mar. 9, 2011.

(56) References Cited

U.S. PATENT DOCUMENTS

| | | | | |
|---|---|---|---|---|
| 2010/0240454 A1* | 9/2010 | Xiao | ............... | A63G 21/20 |
| | | | | 463/30 |
| 2012/0149479 A1* | 6/2012 | Nemeth | ............... | A63G 1/30 |
| | | | | 472/119 |

OTHER PUBLICATIONS

Burg et al ("Entertaining with Science, Educating with Dance", Computers in Entertainment (CIE) 4.2 (2006): 7).*
Zeltzer et al ("A Virtual Environment System for Mission Planning", 1992, IMAGE VI Conference).*
HPP ("High Performance Productions", 2009, https://web.archive.org/web/20091009023548/http://www.highperformanceproductions.net/rigging.html, https://web.archive.org/web/20091010090501/http://www.highperformanceproductions.net/gallery.html ).*
Shen et al, Dynamics and Control of a 3D Pendulum, 2004, IEEE.
Li et al, DMDL for choreography, 2005, IEEE.
Taesoo Kwon et al, Control Systems for Human Running using an Inverted Pendulum Model and a Reference Motion Capture Sequence, Jun. 18, 2010, ACM.
Cihan Sahin et al, Development of remote control and monitoring of web-based distributed OPC system, 2009, Computer Standards & Interfaces.

* cited by examiner

FLYING EFFECTS CHOREOGRAPHY SYSTEM

RELATED APPLICATION DATA

This application is a continuation of U.S. patent application Ser. No. 13/415,370, filed Mar. 8, 2012, which claims priority to U.S. Provisional Patent Application Ser. No. 61/450,768, filed Mar. 9, 2011.

FIELD OF THE INVENTION

The invention relates to flying effects for stage, film, and other events, and particularly to a flying effects choreography system for electronically creating and visualizing flying effects.

BACKGROUND OF THE INVENTION

Flying effects are widely used and highly entertaining aspects of stage, film, and other performances. It has long been a dream for humans to fly, and flying effects do just that.

One goal of flying effects is to have an actor, prop, or other element move naturally during a performance. A substantial amount of planning, physical rigging, and choreography must be undertaken to achieve this, while ensuring that the flying effect is in harmony with the remainder of the performance. For instance, to make a performer fly, his or her velocity, horizontal and vertical movement must be controlled not simply to move the performer from one location to another but to make him or her do so in a way that enhances and not detracts from the performance at hand. As an example, it may not be desirable for an elegant character to fly in an unembellished way.

From the discussion that follows, it will become apparent that the present invention addresses the deficiencies associated with the prior art while providing numerous additional advantages and benefits not contemplated or possible with prior art constructions.

SUMMARY OF THE INVENTION

A flying effects choreography system is disclosed herein. The flying effects choreography system allows choreographers and other users to quickly visualize flying effects, including the swinging and swaying that will occur during such effects. For example, the flying effects choreography system may provide one or more visualizations that show a path of motion for a performer (or other element) that is attached to a free-swinging cable. Because the flying effects choreography system shows the pendulum effect of such cable, the choreographer can immediately see how a performer will move through a scene, stage, or set. This is highly beneficial in that it greatly reduces, if not eliminates, real world trials or tests of flying effects which are complex and time consuming to implement.

As will be described herein, the flying effects choreography system may have various configurations. In one embodiment for example, a flying effects choreography system may comprise one or more input devices configured to receive flying effect data comprising a sequence of one or more waypoints (each of the waypoints defining a position in space), and a physics engine configured to generate position data comprising a sequence of one or more spatial coordinates identifying a location of a performer hanging from a first end of a free-swinging pendulum cable as a second end of the pendulum cable is moved through the sequence of one or more waypoints. The physics engine may be configured to apply one or more laws of motion to generate the position data.

A visualization engine may be included to generate one or more visualizations of the position data. The visualizations may comprise a graphical representation of the location of the performer. One or more output devices may be used to present the visualizations to a user.

Various methods of choreographing flying effects are also disclosed herein. In general, these methods include providing one or more motion paths, and viewing a visualization of a resulting path of motion for a performer moving along one of the motion paths to determine its suitability or unsuitability for a flying effect. If the performer's motion is as desired, then it may be approved and used in a real world flying effect. If not, the user may modify the one or more motion paths until a desired path of motion for a performer results.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
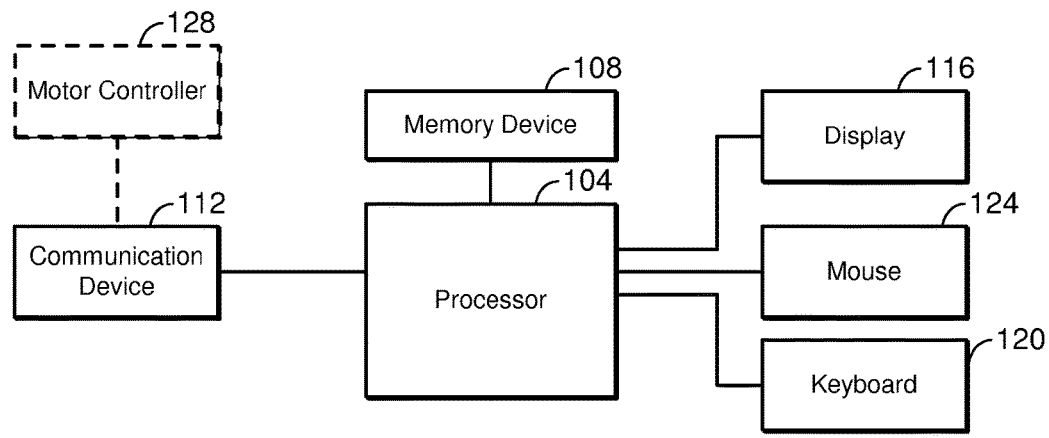
FIG. 1 is a block diagram illustrating components of an exemplary flying effects choreography system.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the flying effects choreography system provides a virtual environment that mimics or simulates a real environment, such as a stage, film set, or the like, in which flying effects may be choreographed. The flying effects choreography system may reproduce one or more flying effects in this virtual environment to provide a visualization of a completed flying effect or different variations thereof.

This is highly advantageous in that it reduces the time, labor, and cost in creating a flying effect. For example, rather than a time consuming and labor/cost intensive process of physically attempting all proposed flying effects for a performance, the flying effects choreography system allows its users to visualize flying effects as they would occur in the real world. This greatly reduces, if not eliminates, the traditional trial and error process in creating the desired flying effect.

In addition to reduction of time, labor, and cost, the flying effects choreography system's visualizations enhance the creative process in creating flying effects. For instance, traditionally a specialist in flying effects translates a choreographer's intentions into the mechanical movements required to lift and move a performer to generate the flying effect. Since flying effects are a relative specialty, the choreographer may have less input into and control over how the end product flying effect looks that is desired. The flying effects choreography system provides an intuitive user interface through which a choreographer may design various flying effects and visualize them in the virtual environment provided by the flying effects choreography system. In this manner, the flying effects choreography system welcomes the choreographer back into the process of creating flying effects. In fact, a choreographer may try any number of ideas in the virtual environment, view them at various angles, and tweak/modify them, all prior to attempting any flying effects in the real world. It is even possible for a flying effect to be finalized within the flying effects choreography system, thus doing away with the need for physically attempting and modify the flying effect (and time, labor, and costs) until it is as desired.

As will be discussed further below, the flying effects choreography system utilizes a physics engine to provide a virtual environment within which flying effects may be accurately visualized. In other words, the flying effects behave in the virtual environment as they would in the real world. Thus, a choreographer or other user is free to experiment and discover and create new flying effects, and view them without the need to physically implement the flying effect. In this way, it can be seen that a much larger number of flying effects may be created and tested for their suitability, before a final version is selected.

The flying effects choreography system will now be described with regard to FIG. 1. FIG. 1 is a block diagram illustrating components of an exemplary flying effects choreography system. In one or more embodiments, the flying effects choreography system may be implemented at or by a computer or computing device. For instance, as can be seen from FIG. 1, the flying effects choreography system may comprise one or more processors 104 and memory devices 108. The processors 104 may execute machine readable code to provide the functionality of the flying effects choreography system as disclosed herein. For instance, the processors 104 may provide a virtual environment and display a visualization of a flying effect in response to user input. The processors may utilize one or more memory devices 108, such as RAM, ROM, cache memory, or the like in executing the machine readable code. A memory device 108 could also be a hard drive, flash drive, removable media drive, or the like. It is contemplated that the machine readable code could be stored on a memory device 108 for retrieval by a processor 104 in some embodiments. For example, machine readable code may be read from a memory device 108 for execution. It is contemplated that a memory device 108 may be integral with a processor 104 in some embodiments. The machine readable code may also be stored on various tangible mediums, such as magnetic, optical, flash, or other storage mediums.

The flying effects choreography system may have one or more input devices and one or more output devices. In general, input devices will be used to collect information or data, such as from a user or an external device. Output devices will typically be used to provide or present information to a user or an external device. For example, as shown, the flying effects choreography system includes an output device in the form of a display 116 or screen. The display 116 may be used to present visualizations of flying effects. In addition, a display 116 may be used to present user interface elements, such as for interacting with the flying effects choreography system. For example, the display 116 may be used to provide feedback to a user creating or modifying a flying effect.

FIG. 1 illustrates a keyboard 120 and a mouse 124 as input devices. The user may utilize the keyboard 120 and mouse 124 to input various data. For example, as will be described further below, a flight path or flight plan for a flying effect may be inputted with the keyboard 120 and/or mouse 124. Other input devices, such as stylus, touch screens, motion capture, joysticks, switches, knobs, and the like may be connected to the flying effects choreography system as well. The input devices may also or alternatively be used to interact with user interface elements of the flying effects choreography system. For example, a user may utilize an input device to interact with and input information into various user interface fields, windows, and views of the flying effects choreography system's user interface.

In one or more embodiments, the flying effects choreography system may include one or more communications devices 112. In general, the communications devices 112 allow the flying effects choreography system to communicate with external devices. The communications devices 112 may provide wired and wireless communication of various types. For instance, a communication device 112 may be a network interface, USB interface, WiFi interface, or other interface or device capable of communicating data with another device. The communications devices 112 may utilize various protocols as well.

As one example, FIG. 1 illustrates a flying effects choreography system in communication with a motor controller 128 via a communication device 112. In this manner, the flying effects choreography system may send instructions to the motor controller 128, such as to control the motor controller's operation. In this manner, a flying effect created within the flying effects choreography system may be exported to one or more motor controllers 128 so that the flying effect may be implemented in the real world. The flying effects choreography system may convert a flying effect into a series of control instructions that can be understood by one or more motor controllers 128.

Communication devices 112 may also be used to communicate with other devices, such as other computers or computing devices. For instance, one or more computers may be cooperatively used to processes data to produce a visualization of a flying effect more rapidly than a flying effects choreography system utilizing a smaller number of computing devices or processors. In addition, a communication device 112 may be used to allow users that are geographically remote to collaborate. For example, a visualization of a flying effect may be presented on a geographically remote display through a communication device 112. Modifications or new flying effects may also be communicated through a communication device 112. Thus, users or choreographers may collaborate in creating or modifying flying effects even though they are remote from one another.

It is noted that an input device may be configured as a communication device in one or more embodiments. This allows data from external devices to be transmitted to the flying effects choreography system and used as input. For example, as will be described below, stage dimensions, flight paths or positions, and other aspects of a performance may be exported from one device (e.g., a computer) to the flying effects choreography system and used as input by the flying effects choreography system.

Figure 2:
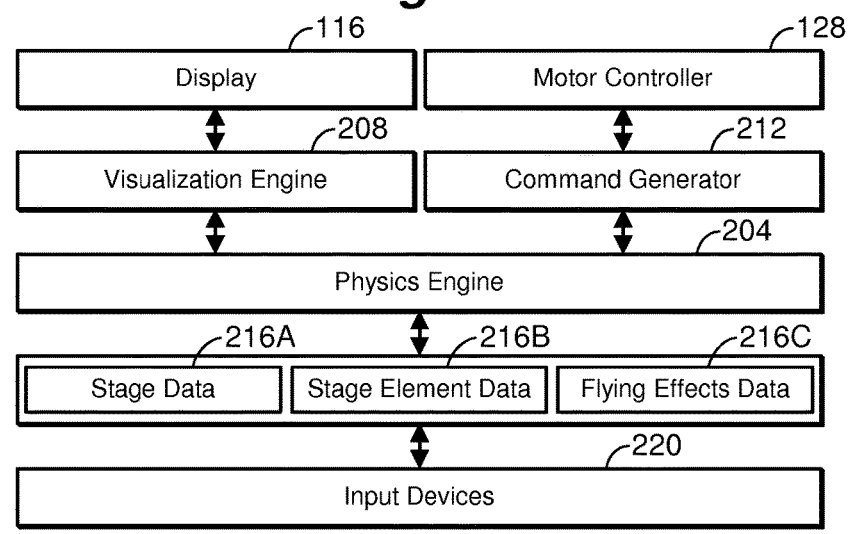
FIG. 2 is a block diagram illustrating functional elements of an exemplary flying effects choreography system.

FIG. 2 is a block diagram illustrating functional elements of the flying effects choreography system and how they cooperate to provide the functionality of the flying effects choreography system as disclosed herein. These elements or components of the flying effects choreography system may be implemented by hardware elements, by machine readable code, or both. For example, in one exemplary embodiment, the machine readable code of the flying effects choreography system may comprise one or more of the elements shown in FIG. 2 and may be executed on one or more processors. It is contemplated that some functional elements (or portions thereof) may be implemented on a hardware device. For example, a physics engine 204 or visualization engine 208, as will be described below, may be implemented by or hardwired into one or more processors.

In FIG. 2, for the purpose of illustration, the elements of the flying effects choreography system have been illustrated in a stack arrangement generally having output at the top and input at the bottom. As can also be seen, input data may be processed or manipulated by various elements of the flying effects choreography system to result in a visualization or other output of a flying effect.

In general, one or more input devices 220, such as those described above, allow the flying effects choreography system to collect data describing a virtual environment and one or more flying effects. For example, one or more input devices 220 may be used to input a stage, set, or the like. To illustrate, the dimensions of a stage or set may be inputted via a keyboard. Alternatively, an external device, such as a CAD system or the like may export dimensions of a stage or set. An input device 220 may also be used to input various stage or set elements, such as props, structures, landscaping, the location of performers, and the like. As can be seen, a virtual environment having the same dimensions as a real environment may be inputted into the flying effects choreography system in this way.

As shown in FIG. 2, stage or set data 216A, stage element data 216B, and/or flying effect data 216C may be collected by one or more input devices 220. Though not shown in FIG. 2, other data may be collected as well. In general, stage data 216A comprises information describing a stage, set, or other area at which a flying effect is to be performed. For instance, as discussed above, the stage data 216A may include the dimensions, floor plan, layout, or the like of a stage or set or other area. In this way, the flying effect may be visualized within a stage. It is contemplated that stage data 216A is not required in all situations since a flying effect may be visualized in virtually any adequate volume of space. Inputting stage data 216A may be helpful in ensuring that the flying effect fits within the confines of a stage, set, or other performance area. As will be discussed above, the stage data 216A may be visualized through the flying effects choreography system, such as by rendering a virtual stage or set as part of the output provided by the flying effects choreography system.

In one or more embodiments, stage element data 216B may comprise data describing stage or set elements. For example, lighting, props, landscaping, backdrops, sets, or structures may be described by stage element data 216B. To illustrate, stage element data 216B may comprise dimensions of various stage elements and their locations. This allows stage elements to be visualized along with a flying effect, such as to ensure the flying effect moves among these elements as desired. It is contemplated that undesired collisions with stage elements may be detected by the flying effects choreography system by inputting the stage elements.

Other characteristics of stage elements may be part of stage element data 216B as well. For example, the weight, material, hardness, elasticity, or other characteristic of a stage element may be inputted. If these stage elements are dynamic (e.g., they move), these characteristics may be used to generate an accurate visualization of the stage elements as they are dropped, thrown, collapsed, moved, or otherwise manipulated.

It is contemplated that stage element data 216B may also include data describing one or more performers, such as the performers on stage at the time of the flying effect. This is beneficial in that it allows a user to see the flying effect occur among the other performers, such as to ensure that a flying performer lands in the proper location for a dialog or other interaction with other performers, or to prevent an unwanted collision with another performer.

The stage element data 216B may also include animation or movement data to set the various stage elements in motion along with the flying effect. In this manner, other performers or props on stage may move as they would during the actual performance. This increases the accuracy of the flying effect visualization and allows a user to modify or create a visualization while keeping the other moving elements of the performance in mind.

As can be seen, stage data 216A and stage element data 216B may be used to define a virtual environment (e.g., a stage or set) where a flying effect may take place. It is contemplated that the virtual environment may be as detailed or as general as desired. For example, a user may not need to visualize non-flying performers, or other stage elements. In such case, the virtual environment may comprise stage data 216A defining an empty volume of space in which the flying effect may be created and visualized. This volume may have defined limits to ensure the flying effect stays within its confines. In an opposite example, it is contemplated that the virtual environment may be detailed, such as by inputting stage element data 216B including props, stage elements, and even performers. In this manner, a user may visualize the interaction between a flying effect and other elements of a performance through the flying effects choreography system.

Figure 3:
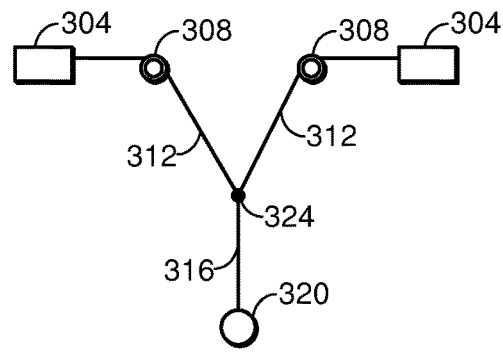
FIG. 3 illustrates an exemplary rigging for a performer of a flying effect.

Flying effect data 216C will now be described with reference to FIG. 3. As shown in FIG. 3, in a physical implementation of a flying effect, a performer will typically be connected to a rigging comprising one or more lines or cables 312 (typically two or more cables) that are actuated by one or more motors, such as winches 304 to move a performer 320 in a horizontal and/or vertical direction. As can be seen, the cables 312 may connect, at an attachment point 324. The cables 312 may be held by one or more pulleys 308 or the like. A pendulum cable 316 may be hung or attached to the attachment point 324. The performer 320 may be attached to the pendulum cable 316, such as shown.

As can be seen, the winches 304 may pull or release one or more of the cables 312 to raise and lower the attachment point 324, to move the attachment point 324 horizontally, or both. The attachment point 324 may be moved in a rigid motion to various points of space. As can be seen, the pendulum cable 316 (and performer 320) may swing freely from the attachment point 324. The pendulum cable 316, being attached to the attachment point 324 in this manner, may be used to give a more natural appearance to a performer's motion. In other words, by attaching the performer 320 to the pendulum cable 316, the performer may swing or sway at least some distance as the attachment point 324 is moved. This produces a more natural movement as compared to that of the attachment point 324 which motion is tightly controlled by the winches 304, pulleys 308, and cables 312.

Though the swing/pendulum effect provided by the pendulum cable 316 is beneficial to generating the desired flying motion, it is also difficult to predict. Traditionally, a trial and error process has been used to generate a motion path for the attachment point 324 which produces the desired motion path for a performer 320. Much iteration may need to be undertaken to produce the desired motion path using traditional trial and error methods. This would typically include carefully adjusting or reprogramming one or more winches 304 at particular points of time to generate the swing or sway that is desired as the performer 320 flies. As will be described further below, the flying effects choreography system includes a physics engine 204 for calculating the motion of a performer attached to the pendulum cable 316.

As its name implies, flying effect data 216C may comprise data describing a flying effect. For example, the path a performer, the performer's rigging (or portion thereof), or other flying element is to take during a flying effect may be contained within the flying effect data 216C. In one embodiment, the flying effect data 216C may comprise a series or sequence of one or more points in space, or waypoints, that define a flying effect. For example, the one or more waypoints may identify an X, Y, and/or Z position to identify a point or location in 3D space. In a sequence or order, the one or more waypoints define a path of motion from one waypoint to the next.

In general, the more waypoints that are defined the more detailed the flying effect's motion will be. For example, rather than a linear path from a first waypoint to a second waypoint, one or more additional waypoints may be added there between to generate an arc, turn, or other motion between the points.

The flying effect data 216C may also include a velocity and/or change in velocity between the one or more waypoints. In this manner, the speed at which a performer moves between points of space may be defined and visualized. For example, a velocity of X m/s may be defined between a first and second point, where X is a numerical value. It is noted that a user may specify a change in velocity at particular points in space or times as well. In this manner, a user may define how fast or slow a performer is moving at any time during the flying effect. It is contemplated that velocity data may describe either or both horizontal and vertical velocity during a flying effect. Alternatively, the velocity data may define a velocity between two waypoints, and the flying effects choreography system (such as through its physics engine 204) may calculate the horizontal and vertical velocity needed to achieve the defined velocity between the two points.

It is noted that velocity may be defined in other ways. For example, velocity may be determined in terms of time. To illustrate, a user may specify a time interval between waypoints and the flying effects choreography system may determine the velocity required to travel between the waypoints within the specified time interval. In this manner, a user may input a shorter time to increase velocity and a longer time to decrease velocity.

It is contemplated that the flying effect data 216C may include various characteristics of the performer and/or flying element (e.g., prop) performing the flying effect. For example, the weight, wind resistance, depth, height, width, shape, or other characteristic of a performer may be inputted if desired. This data may then be used to generate visualization of the performer during the flying effect, including one or more of these characteristics. For example, the height, width, and/or depth of the performer may visualized, such as by a rectangular or spherical shape. It is contemplated that the performer's shape may be inputted in some embodiments, in this manner, the visualization may represent a performer or other element with such shape.

Once data is collected, a physics engine 204 may utilize at least the flying effect data 216C to generate a visualization of one or more flying effects. In general, the physics engine 204 is configured to determine the motion of a performer or other flying element during a flying effect. For example, as discussed above, the physics engine 204, may calculate the motion of a pendulum cable 316 and/or a performer 320 attached thereto as the pendulum cable 316 is moved from one waypoint to the next. The physics engine 204 may be configured with Newtonian or other laws or rules of motion in some embodiments.

In this manner, the physics engine 204 may calculate a path of motion for a performer that will reflect the performers' motion in the real world. For example, the physics engine 204 may calculate a path of motion in both a horizontal and vertical dimension based on the points of space and/or velocity data in the flying effect data 216C.

The physics engine 204 of the flying effects choreography system reduces, if not eliminates, the time consuming and inaccurate trial and error process for creating appealing flying effects. In one or more embodiments, the physics engine 204 may implement a version of the rigging, like that shown in FIG. 3. For example, the physics engine 204 may implement a pendulum cable 316 supported at an attachment point 324 to make its calculations. The physics engine 204 may then determine the amount the pendulum cable 316 and a performer 320 (or other element) swings or sways as the attachment point 324 is moved. This information describes the path of motion (including the pendulum\swinging effect produced by securing the performer via the pendulum cable) that the performer 320 will take as the attachment point 324 is moved.

The physics engine 204 may perform one or more calculations using laws or rules of motion to predict the path at which a performer 320 will move as the attachment point 324 is moved. These laws or rules may be implemented as machine readable code and/or hardwired into a processor of the flying effects choreography system. As described above, the calculations may take into account the various characteristics defined in the flying effects data. In addition, it is contemplated that characteristics regarding the cables may be included in the flying effects data. For example, the length of the pendulum cable 316 may be used in calculating the motion path of the performer 320 as the attachment point 324 moves.

In one or more embodiments, the physics engine's calculations may generate position data for a performer 320 tethered to an attachment point 324 by a pendulum cable 316. For example, the position data may include one or more spatial coordinates defining the horizontal and/or vertical position (e.g., a position in X, Y, and Z space) of the performer 320 at various times. The spatial coordinates may be in a sequence or order such that the performer's motion over time is defined.

In this manner, the position data defines positions over time and thus defines a motion path for a performer 320 over a period of time. For example, the position data may state that the performer 320 is at spatial coordinates X1,Y1,Z1 (in 3D space) at time A, and that the performer is at spatial coordinates X2,Y2,Z2 at time B, spatial coordinates X3,Y3, Z3 at time C, and so on and so forth. It is noted that the calculations may also result in position data defining the location of the pendulum cable 316, and/or one or more other cables 312 at various times. In one or more embodiments, the results data may be stored on a memory device.

The position data may be used in various ways. For example, as shown in FIG. 2, the position data from the physics engine 204 may be provided to a visualization engine 208. The visualization engine 208 may draw or present a visualization of the flying effect based on the position data. For example, the visualization engine 208 may draw a performer (or a representation thereof) at the positions defined in the position data at the times specified in the position data. In this manner, an animation showing the motion of the performer 320 may be generated. The visualizations (e.g., graphical representations) may then be presented to a user, such as on a display 116 of the flying effects choreography system. In this manner, the flying effect may be visualized without physically implementing the flying effect.

The visualization engine 208 may provide visualizations of other data as well. For example, the visualization engine 208 may present the position/motion of pendulum 316 and other cables 312, an attachment point 324 and other elements. In one or more embodiments, the visualization engine 208 may display a visualization of stage data or stage element data. For example, a visualization of stage props, the stage itself, or other elements may be generated. In this manner, a flying effect may be visualized among other stage elements of a performance and within or at a particular stage, set, or other area. It is contemplated that the physics engine may be configured to generate position data for stage elements as well and that the stage elements movements/position may be visualized along with that of the flying effect.

It is contemplated that the visualization produced by the visualization engine 208 may comprise one or more graphics or frames. These may be compiled into a video file or an animation for viewing. Typically, the visualization engine 208 will produce graphical representations of the flying effect, such as a 2D or 3D animation. In addition, the user's viewing perspective may be adjusted so that the flying effect may be viewed from various angles and positions. It is contemplated that the visualization engine 208 may also present position data in other human readable forms. For example, the position data may be represented as numerical values, such as coordinates, at various times.

The output of the visualization engine 208 may be viewed as an animation or be paused, such as to see the position of a performer (or other elements) at specific points of time. In addition, the output may be repeatedly viewed in its entirety or portions of the output may be repeated. In this manner, the user can see the flying effect any number of times to ensure that the flying effect is as desired. In this manner, the user can get a very detailed view of the performer's motion and then tweak or modify the movement so that it is as desired. It is contemplated that the visualization engine 208 may allow a user to zoom or focus on particular points in the flying effect to allow such portions of a flying effect to be carefully reviewed.

It is contemplated that the position data from the physics engine 204 may also or alternatively be used to generate one or more commands or instructions to physically control flying effects in one or more embodiments. For example, a command generator 212 may be provided to read the position data and generate one or more instructions usable by a motor controller 128 to control the operation of one or more motorized elements, such as winches. These instructions will operate the motorized elements such that the visualized flying effect in the virtual environment of the physics engine can be reproduced with real world physical movements. For example, by executing the instructions, a physical attachment point may be moved to the same positions at the same velocities of a virtual attachment point to generate the performer's motion path as calculated and visualized using the flying effects choreography system.

In the case of winches, the one or more instructions may include commands to pull or release particular lengths of cable in or out to move an attachment point to a predefined position. The instructions may take into account or detect any cable slack and cause a winch or motor to collect or reel in the slack. It is noted that the physics engine 204 or command generator 212 may be configured to detect slack in one or more of the cables 312. For example, it may be determined, based on the length of cable extended, and the position of the attachment point 324, whether or not one or more cables will have slack. If so, the cable may be reeled in to eliminate this slack. This is beneficial in ensuring the cables 312 do not get tangled and the rigging system operates properly in the real world.

Figure 4A:
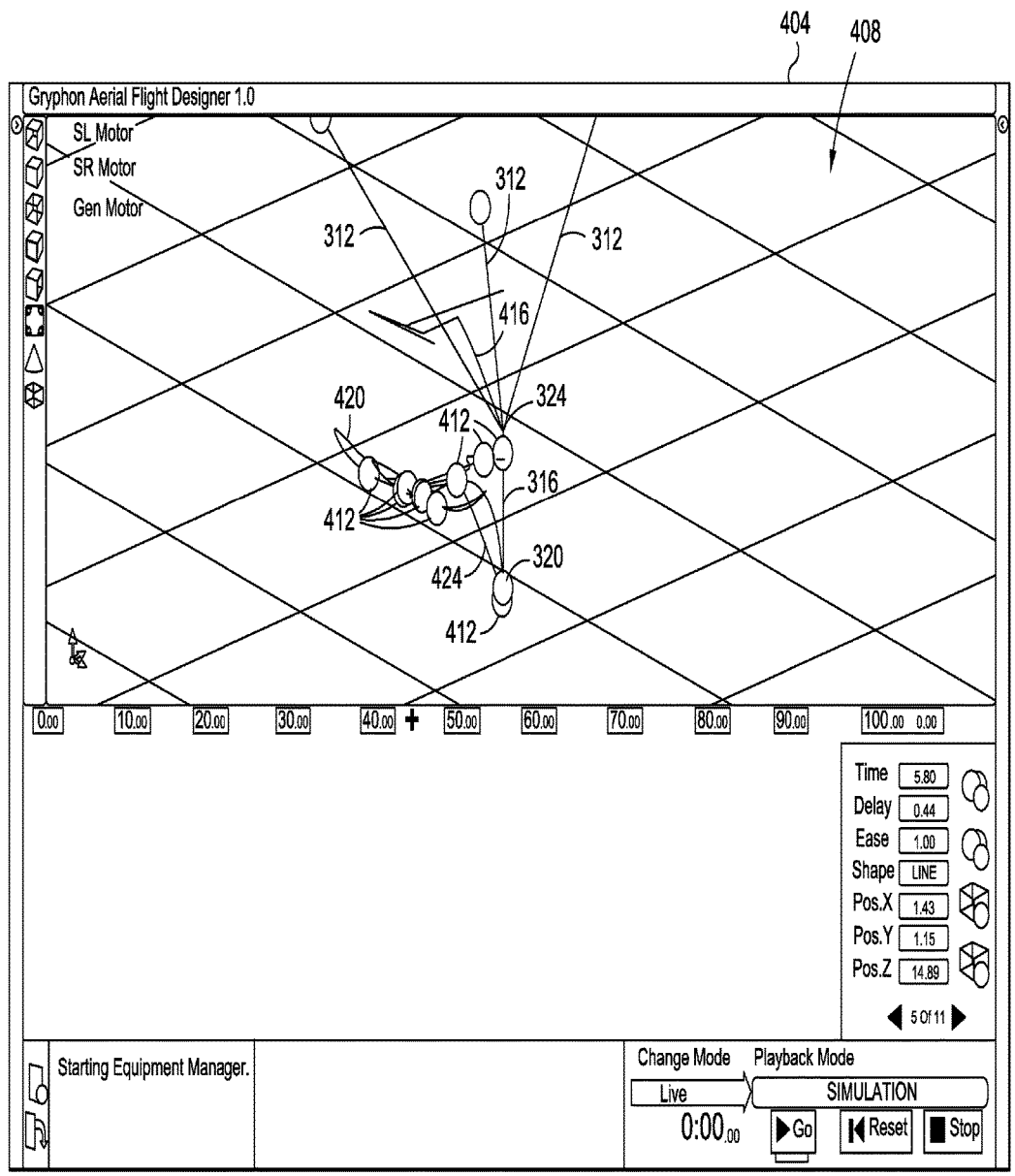
FIG. 4A illustrates a user interface screen of an exemplary flying effects choreography system.
Figure 4B:
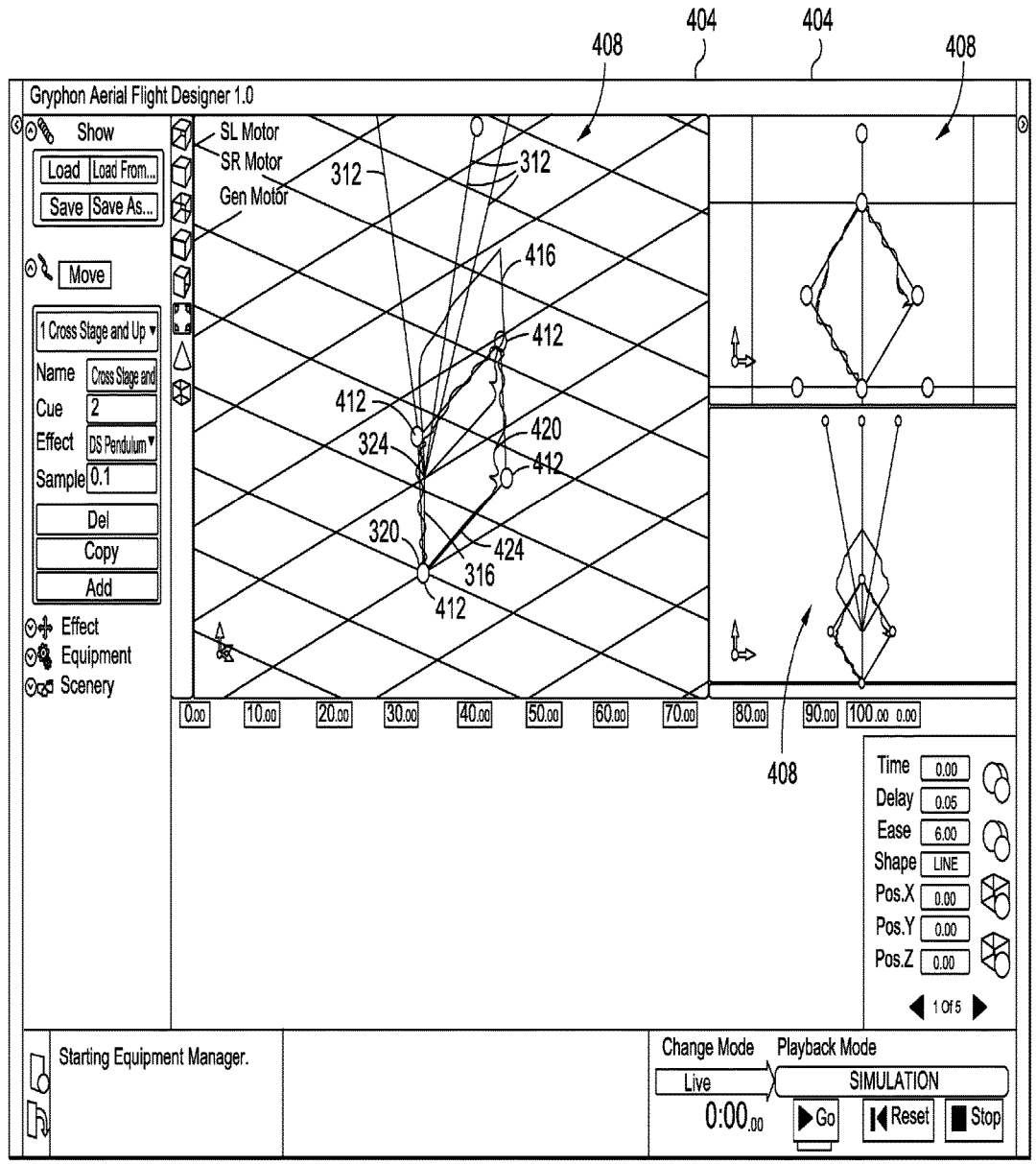
FIG. 4B illustrates a user interface screen of an exemplary flying effects choreography system.
Figure 4C:
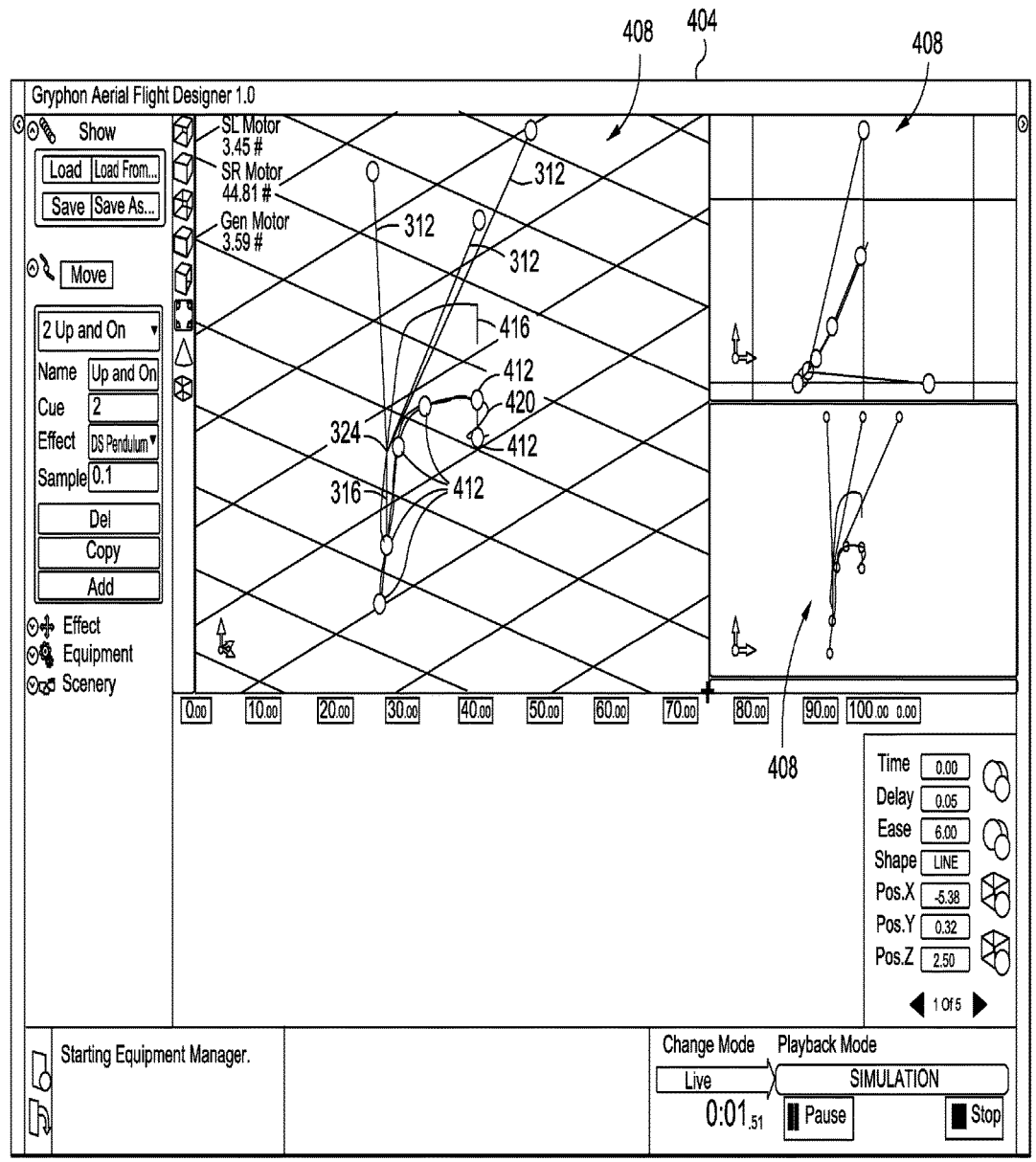
FIG. 4C illustrates a user interface screen of an exemplary flying effects choreography system.

FIGS. 4A-4C illustrate exemplary user interface screens 404 that may be presented by a flying effects choreography system, such as on a display connected to the system. As can be seen, the interface screens 404 may provide various viewing areas 408 that generally provide a 2D (see right view panes of FIGS. 4B-4C) or 3D view of a flying effect. In addition the interface screens 404 may include one or more controls, such as buttons, input fields, drop down lists, and the like to accept input or allow the user to interact with and/or control the flying effects choreography system.

A variety of information may be visualized through the flying effects choreography system. As shown in FIGS. 4A-4C for instance, a visualization of position data for various flying effects has been presented. Referring to FIG. 4A for instance, a virtual 3D environment has been presented in a viewing area 408. A rigging setup for moving a performer 320 may also be displayed within the environment. For instance, FIG. 4A shows a performer 320 supported by a pendulum cable 316 that is attached at an attachment point 324 to a plurality of cables 312. A set of points in space 412 are also illustrated. These are the points through which the performer 320 may travel during a flying effect.

The visualization engine may present one or more motion paths statically or through animation. FIG. 4A illustrates some exemplary static motions paths displayed as lines. The motion path of the attachment point 324 is illustrated as one line, while the motion path of the performer 320 is illustrated as another line. As can be seen, the motion path of the performer 320 includes numerous curves representing the swinging or swaying motion the performer will undergo as he or she is moved. In some embodiments, a motion path between the points 424 may also be displayed. This is beneficial in showing the sequence that motion occurs through the points from beginning to end.

FIG. 4B illustrates a diamond shaped pattern of points 412. As can be seen, the attachment point 324 may be moved in a diamond shaped motion path 416. As a result, the performer 320 may move in a diamond pattern in a motion path 420 including one or more curves (which represent the swing of the performer on the pendulum cable 316). FIG. 4C illustrates another exemplary flying effect. An attachment point motion path 416 and performer motion path 420 are shown in FIG. 4C as well. Though shown presenting static images, it is noted that the viewing areas 408 may presented animated visualizations of a flying effect.

Figure 5:
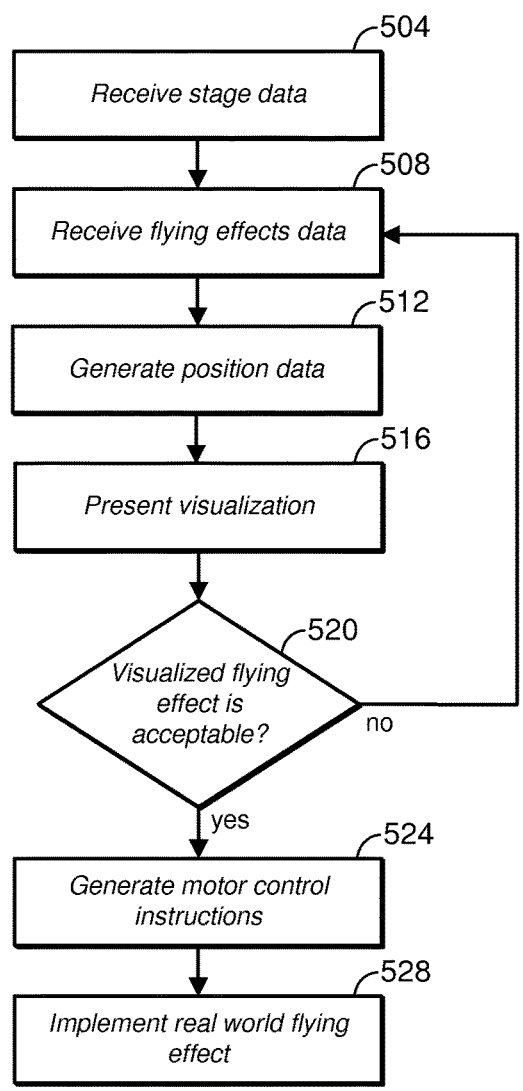
FIG. 5 is a flow diagram illustrating operation and use of an exemplary flying effects choreography system.

Use and operation of the flying effects choreography system will now be described with regard to FIG. 5. FIG. 5 is a flow diagram illustrating use and operation of an exemplary flying effects choreography system. As can be seen, at a step 504, stage data may be received by the flying effects choreography system, such as through one or more input devices as discussed above. At a step 508, flying effects data may be received through one or more input devices. As discussed above, data may be inputted manually or be communicated to the flying effects choreography system by another computer or computing device. It is noted that stage data may be optional since flying effects may occur in any space.

At a step 512, position data may be generated by applying laws or rules of motion to the flying effects data. This will typically occur by utilizing a physics engine to processes the flying effects data to generate position data. In one or more embodiments, position data at least for a performer may be generated using one or more waypoints defined in the flying effects data. As stated above, the performer may be tethered to a pendulum cable and physics engine may take this into account and generate position data that shows how a performer will swing on the pendulum cable as the cable and performer are moved.

As stated, the flying effects data may comprise one or more waypoints for various items in the flying effect. Therefore, a user may define waypoints for various items. In one embodiment for example, the user may be permitted to define one or more waypoints for the attachment point 324 of a performer's rigging and the physics engine may calculate the performer's motion (including the pendulum effect) as a result of moving the attachment point 324 in this manner. Alternatively or in addition, the user may define one or more waypoints for the performer 320. The physics engine may then generate a motion path including the pendulum effect that causes the performer 320 to travel through these waypoints.

At a step 516, a visualization may be generated from the position data, such as by a visualization engine. The resulting visualization may be viewed, studied, shared, or the like one or more times. This allows a user to conduct a detailed review of the performer's motion during the flying effect. At a decision step 520, it may be determined if the flying effect is as desired. For example, the visualization may be shared with users, other choreographers, performers, and others for approval or opinions.

If, the flying effect is not what is desired, then additional or alternate flying effects data may be received at step 508. For example, a user may modify or delete or add flying effects data to alter the performer's motion in the flying effect. To illustrate, the user may add additional points or remove points to better define the desired motion path for the performer. The user may also or alternatively alter velocities or the speed at which the performer travels between such points, such as to reduce the amount of swinging the performer undergoes. The user may also move existing points to change the shape of the performer's motion path.

The physics engine may then generate new position data at step 512 for visualization at step 516. It is contemplated that the physics engine and visualization engine may operate as the user is modifying or adding flying effects data. In this manner, the user may see the results of his or her changes very quickly if not instantaneously. This allows the user to understand what effect the user is having on the flying effect. In this manner, the user may then continue modifying the flying effects data until the desired flying effect is produced.

At decision step 520, if the flying effect is as desired (e.g., is approved), then at a step 524, one or more instructions may be generated to physically control the flight of an actual performer. For instance, one or more instructions for one or more motor or winch controllers may be generated. These instructions will typically cause the motors or winches to move the pendulum cable such as shown in the visualization. When the actual pendulum cable is moved in this manner, it will swing as shown in the visualization. In this manner, the flying effect created in the flying effects choreography system may be implemented in a real world performance.

Once the instructions are prepared, a real world flying effect may be executed according to the instructions at a step 528. The actual flying effect may utilize rigging and an actual performer as well as stage elements. In addition, the actual flying effect may take place on a stage or set. The actual flying effect may be performed one or more times to confirm its similarity to the visualization and its suitability for the performance.

As can be seen, with the flying effects choreography system, the actual real world flying effect need only be performed at the end of the choreography process. Unlike traditional methods, the actual flying effect need not be repeatedly attempted in a time consuming physical process to achieve the desired effect. With the flying effects choreography system, any number of visualizations may be quickly and easily generated and one or some of them may be selected for actual use in the real world. This greatly enhances the choreography process for flying effects, and allow choreographers (who may not know much about flying effects) to be involved in creating and fine tuning flying effects.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A flying effects choreography system comprising:
   machine-readable code stored in a tangible medium and executable by a processor of a computing device to cause said processor to accept input from one or more input devices of flying effects choreography as flying effect data, the flying effect data comprising a sequence of one or more waypoints, each of the one or more waypoints defining a position in space of a desired position of a performer;
   a physics engine comprising machine-readable code stored in a tangible medium and executable by said processor to generate, by applying one or more laws of motion as applied to said one or more waypoints comprising said flying effect data, position data comprising a sequence of one or more spatial coordinates identifying a location of a pendulum attachment point, said pendulum attachment point comprising a point of attachment of a second end of a free-swinging pendulum cable to rigging which is configured to move the second end of the pendulum cable through space, the pendulum cable having a first end with an attachment point to attach to and support the performer; and a command generator comprising machine-readable code stored in a tangible medium and executable by said processor to generate motor control commands based upon said generated position data, said motor control commands configured to cause one or more winch control motors to move said rigging to move said pendulum attachment point through the sequence of one or more spatial coordinates to move the performer through the sequence of one or more waypoints.

2. The flying effects choreography system in accordance with claim 1 further comprising a motor controller which is configured to receive said motor control commands from said command generator.

3. The flying effects choreography system in accordance with claim 2 wherein said rigging comprises cables.

4. The flying effects choreography system in accordance with claim 1 wherein said processor is further configured to receive flying effect data in the form of one or more of stage data, stage element data and velocity data.

5. The flying effects choreography system in accordance with claim 1 further comprising a visualization engine comprising machine-readable code stored in a tangible medium and executable by said processor to cause said processor to cause a video display to display one or more visualizations of the generated position data, the one or more visualizations including a graphical representation of the location of the performer.

6. The flying effects choreography system in accordance with claim 5 wherein said visualization engine is further configured to display a graphical representation a stage.

7. A method of choreographing a flying effect comprising the steps of:

receiving choreography of a flying effect as flying effect data into a computing device, said flying effect data comprising a sequence of one or more waypoints, each of the one or more waypoints defining a position in space of a desired position of a performer;

generating, via said computing device applying one or more laws of motion as applied to said one or more waypoints comprising said flying effect data, position data comprising a sequence of one or more spatial coordinates identifying a location of a pendulum attachment point, said pendulum attachment point comprising a point of attachment of a second end of a free-swinging pendulum cable to rigging which is configured to move the second end of the pendulum cable through space, the pendulum cable having a first end with an attachment point to attach to and support the performer; and generating, via said computing device, motor control commands based upon said generated position data, said motor control commands configured to cause one or more winch control motors to move said rigging to move said pendulum attachment point through the sequence of one or more spatial coordinates to move the performer through the sequence of one or more waypoints.

8. The method in accordance with claim 7 further comprising the step of generating, via said computing device, one or more visualizations of the generated position data, the one or more visualizations including a representation of the location of the performer, and displaying said one or more visualizations to a user via an electronic video display device.

9. The method in accordance with claim 8 further comprising the step of receiving stage data, generating a stage visualization and displaying said stage visualization in conjunction with said visualization of said position data.

10. The method in accordance with claim 7 further comprising the step of controlling one or more winch control motors with said motor command information.

11. The method in accordance with claim 7 further comprising receiving into said computing device one or more of stage data, state element data and velocity.

* * * * *